US012744605B2

(12) United States Patent
Solanki et al.

(10) Patent No.: US 12,744,605 B2

(45) Date of Patent: Sep. 22, 2026

(54) PHASE SHIFT OF SIGNALS FOR RFI MITIGATION

(71) Applicant: Intel Corporation, Santa Clara, CA (US)

(72) Inventors: Sudarshan Dilip Solanki, Bangalore (IN); Bala P. Subramanya, Bangalore (IN); Soumyakanti Roy, Kolkata (IN); Yagnesh V. Waghela, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/123,501

(22) Filed: Mar. 20, 2023

(65) Prior Publication Data

US 2023/0291485 A1 Sep. 14, 2023

(51) Int. Cl.

*H04B 17/345* (2015.01)
*H04B 1/525* (2015.01)
*H04B 17/318* (2015.01)

(52) U.S. Cl.

CPC .......... *H04B 17/345* (2015.01); *H04B 1/525* (2013.01); *H04B 17/318* (2015.01)

(58) Field of Classification Search

CPC .. H04B 17/345; H04B 17/318; H04B 17/364; H04B 15/04; H04B 1/525

See application file for complete search history.

(56) References Cited

U.S. PATENT DOCUMENTS

| | | | | |
|---|---|---|---|---|
| 8,744,395 | B1 * | 6/2014 | Mitchell | H04B 1/525 455/242.1 |
| 2012/0252392 | A1 * | 10/2012 | Wilkerson | H04B 1/10 455/278.1 |
| 2013/0335151 | A1 * | 12/2013 | Schrom | H03B 29/00 331/34 |
| 2014/0153656 | A1 * | 6/2014 | Hsu | H04L 7/0331 375/259 |
| 2014/0219401 | A1 * | 8/2014 | Finkelstein | H04B 15/06 327/175 |
| 2021/0088671 | A1 * | 3/2021 | Meurer | G01S 19/21 |
| 2021/0288684 | A1 * | 9/2021 | Ganesan | H03M 1/0604 |

FOREIGN PATENT DOCUMENTS

| | | | | |
|---|---|---|---|---|
| CN | 103760506 A | * | 4/2014 | G01R 33/36 |
| WO | WO-2019066834 A1 | * | 4/2019 | H04L 25/024 |

OTHER PUBLICATIONS

"Hardware and Layout Design Considerations for DDR Memory Interfaces", DSD Applications, Freescale Semiconductor, Inc., Austin, TX, Rev. 6, 2007, 48 pgs.

* cited by examiner

*Primary Examiner* — Kenny S Lin

(74) *Attorney, Agent, or Firm* — Essential Patents Group, LLP

(57) ABSTRACT

An example of an apparatus may include signal circuitry to provide a first set of one or more signals and a second set of one or more signals for an electronic device, and radio frequency interference (RFI) mitigation circuitry coupled to one or more of the signal circuitry, the first set, and the second set to provide a delay between respective signals of the first and second sets based on RFI mitigation information associated with the respective signals. Other examples are disclosed and claimed.

13 Claims, 8 Drawing Sheets

70

| Signal(s) | Phase Shift (ps) |
|---|---|
| P1 | 0 |
| P2 | 0 |
| P3 | 0 |
| P4 | 0 |
| P5 | -13.3 |
| P6 | -40 |
| P7 | -66.7 |
| P8 | -100 |

PHASE SHIFT OF SIGNALS FOR RFI MITIGATION

BACKGROUND

Many electronic systems, such as computers, tablets, and cellular phones, include different devices. Examples of such devices include a host (e.g., a processor device), a memory device, and other integrated circuit (IC) device. The devices communicate with each other using signals (e.g., data signals and timing signals (e.g., strobe signals)). To improve accuracy in signals communicated between these devices, many conventional techniques are available for calibration of circuitry (e.g., receivers and transmitters) in these devices. In some conventional techniques, a device that includes an interface for communication with a host may include components that may operate during at least one of read link training and duty cycle distortion compensation operation.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
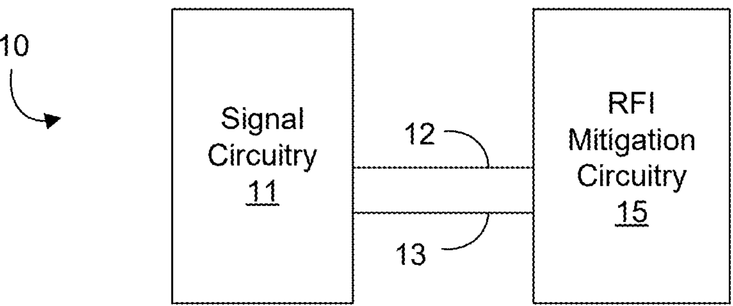
FIG. 1 is a block diagram of an apparatus according to an example.

One or more examples or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; nonvolatile (NV) memory devices; qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every example may not necessarily include the particular feature, structure, or characteristic. Moreover, such phrases are not necessarily referring to the same implementation. Further, when a particular feature, structure, or characteristic is described in connection with an example, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JE- DEC), such as JESD79F for double data rate (DDR) SDRAM, JESD79-2F for DDR2 SDRAM, JESD79-3F for DDR3 SDRAM, JESD79-4A for DDR4 SDRAM, JESD79-5B for DDR5, JESD209 for Low Power DDR (LPDDR), JESD209-2 for LPDDR2, JESD209-3 for LPDDR3, JESD209-4 for LPDDR4, and JESD209-5 for LPDDR5 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Various interfaces may support various specifications for high speed communications between devices. For example, Peripheral Component Interconnect Express (PCIe), Universal Flash Storage version 3.0 (UFS 3.0), Open NAND Flash Interface (ONFI), and other interfaces may support various specifications for a device input/output (IO) interface that includes communications between devices (e.g., a host, such as a processor device) that may operate at high speeds (e.g., 800 megatransfers per second (MT/s), 1.6 gigatransfers per second (GT/s), or higher).

Operating IO interfaces at a relatively high speed may suffer significant asynchronous clock (AC) timing margin loss due to channel losses, device internal variations (e.g., due to process, voltage, and temperature (PVT) and internal timing mismatches) and host-side losses (e.g., due to host-side DQ (data) and DQS (clock) mismatches). Some devices (e.g., memory/interface chip/repeater/retimer devices) may utilize read link training technology to improve read system AC timing margin loss. Operating IO interfaces in at a relatively high speed may also suffer significant duty cycle distortion (DCD) in the data output path related to timing margin loss due to the above-mentioned factors (e.g., channel losses, memory internal PVT variations). Some devices may further include duty cycle correction (DCC) technology in the data output path to improve system DCD-related AC timing margin loss.

Another problem with some high-speed interfaces involves radio frequency interference (RFI). Some electronic systems may include one or more antennas or may otherwise be operated in close proximity to one or more antennas, such that RFI from the high-speed interface may cause problems at the antenna. For example, higher memory speeds may increase an amount of RFI risk. As the memory speed goes higher than 1.6 GT/s, in some systems, the RFI level may exceed a desired amount of maximum RFI for the system. One approach to reducing RFI from signal traces is to route more signal traces on inner layers of a multi-layer printed circuit board (PCB). A problem is that the cost of the printed circuit board increases when the number of inner layers increases. Another approach to reducing RFI is to provide an antenna barricade (e.g., physical shielding). A problem is that such barricade increase cost and may not provide sufficient shielding. Another approach to reducing RFI from signal traces involves frequency shifting of the signals. A problem with frequency shifting of high speed interface signals is a performance drop for the system. Some examples may overcome one or more of the foregoing problems.

Some examples provide technology to lower RFI risk from high-speed interface signals, such as memory clock and/or data signals. Some applications may be relatively cost sensitive. A PCB stack up with low layer count (e.g. at lower cost) may not allow routing of all the signal traces (e.g., clock signals, IO signals, etc.) with potentially problematic RFI in inner layers of the PCB stack up. Some examples may provide technology for phase shifting clocks to lower an amount of RFI at a location of an antenna. Advantageously, some examples may reduce the RFI risk and allow surface layer routing of the phase shifted clocks signals (e.g., reducing or eliminating the additional cost of chassis level shielding). Another advantage is that some examples may provide better performance as compared to frequency shifting of signals to mitigate RFI.

With reference to FIG. 1, an example of an apparatus 10 may include first circuitry 11 (e.g., signal circuitry) to provide a first set 12 of one or more signals and a second set 13 of one or more signals for an electronic device, and second circuitry 15 (e.g., RFI mitigation circuitry) coupled to one or more of the first circuitry 11, the first set 12, and the second set 13 to provide a delay between respective signals of the first and second sets 12, 13 based on RFI mitigation information associated with the respective signals. For example, the second circuitry 15 may be configured to determine the RFI mitigation information from a configuration structure. In some examples, the configuration structure may include one or more resistors to be populated to indicate respective amounts of delay to be applied to the respective signals of the first and second sets 12, 13. Alternatively, or additionally, the configuration structure may include a data structure to store a table that indicates respective amounts of delay to be applied to the respective signals of the first and second sets 12, 13. For example, the second circuitry 15 may be configured to program the data structure based on the populated one or more resistors.

In some examples, the first set 12 may comprise signals to be designated as noise sources and the second set 13 may comprise signals to be designated as noise mitigators, and the data structure may be further to store respective amounts of delay that corresponds to destructive interference between the noise sources and the noise mitigators at an antenna location relative to a location of the respective signals of the first and second sets 12, 13. For example, the signals to be designated as noise sources may be located closer to the antenna location relative to the signals to be designated as noise mitigators. In some examples, one or more of the respective signals may correspond to a signal that includes a conductive trace on an outermost layer of a circuit board, and/or the electronic device may comprise a memory device.

Figure 2:
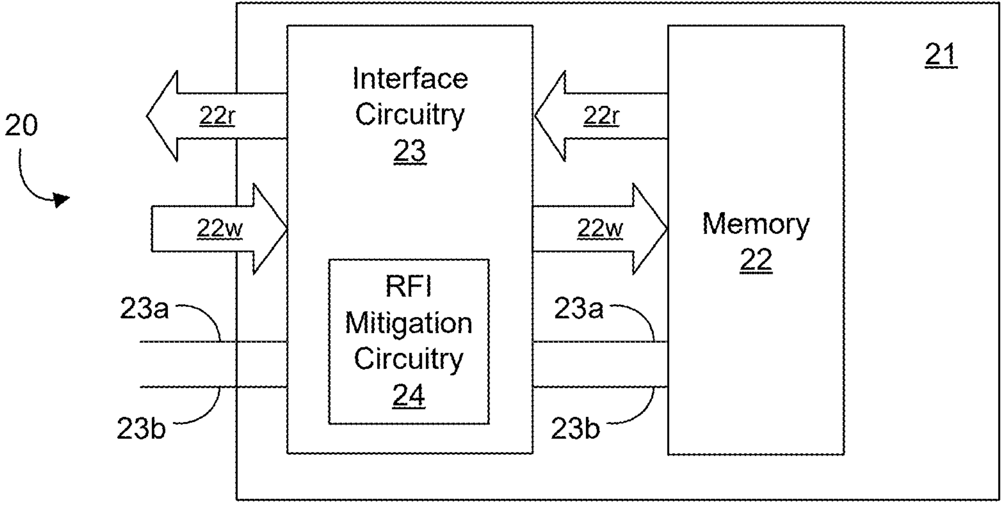
FIG. 2 is a block diagram of a memory device according to an example.

With reference to FIG. 2, an example of a memory device 20 may include a circuit board 21, memory 22 on the circuit board 21, and interface circuitry 23 on the circuit board 21 coupled to the memory 22 to provide a plurality of output data read paths 22*r* and a plurality of input data write paths 22*w* for the memory 22. The interface circuitry 23 may further include two or more clock signal pairs 23*a* and 23*b* for the memory 22, and RFI mitigation circuitry 24 coupled to the two or more clock signal pairs 23*a*, 23*b* to provide a phase shift between respective clock signal pairs based on configuration information. For example, a clock signal pair may correspond to a differential clock pair that includes a clock signal (CLK) and a complement of the clock signal (not CLK, _CLK). In some examples, the interface circuitry 23 may be configured to determine the configuration information based on a resistance amount of one or more resistors populated on the circuit board 21. Additionally, or alternatively, the interface circuitry 23 may be configured to determine the configuration information from a data structure. For example, the interface circuitry 23 may be further configured to program the configuration information in the data structure based on the resistance amount of the one or more resistors populated on the circuit board 21.

In some examples, the data structure may comprise a table that indicates respective amounts of delay to be applied to the respective clock signal pairs. For example, an amount of delay to be stored in an entry of the table for a first clock signal pair (e.g., CLKA/_CLKA) of the two or more clock signal pairs 23*a*, 23*b* may be based on a distance between the first clock signal pair and a second clock signal pair (e.g., CLKB/_CLKB) of the two or more clock signal pairs 23*a*, 23*b* (e.g., a pair-to-pair spacing between the first clock signal pair and the second clock signal pair). In some examples, the second clock signal pair may correspond to a noise source and the first clock signal pair may correspond to a noise mitigator, and the amount of delay to be stored in the entry of the table for the first clock signal pair may correspond to a phase shift between the first clock signal pair and the second clock signal pair for destructive interference between the noise source and the noise mitigator at an antenna location relative to a location of the first clock signal pair and the second clock signal pair. For example, clock signal pairs to be designated as noise sources are to be located closer to the antenna location relative to clock signal pairs to be designated as noise mitigators. In some examples, one or more of the two or more clock signal pairs 23*a*, 23*b* includes a conductive trace on an outermost layer of the circuit board 21.

Figure 3:
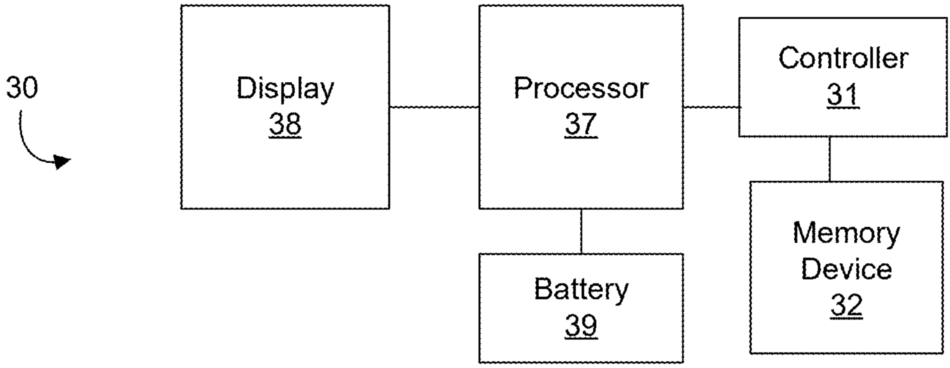
FIG. 3 is a block diagram of a system according to an example.

With reference to FIG. 3, an example of a system 30 may include a controller 31, and a memory device 32 coupled to the controller 31. For example, the memory device 32 and/or the controller 31 may include one or more features or aspects of the examples described herein. In particular, the memory device 32 may include one or more features or aspects of the apparatus 10 (FIG. 1), the memory device 20 (FIG. 2), and/or other examples of the RFI mitigation technology described herein.

In some examples, the memory device 32 may comprise a circuit board, memory on the circuit board, and two or more clock signal pairs for the memory. In some examples, the controller 31 may be configured to apply a phase shift between respective clock signal pairs of the two or more clock signal pairs for the memory based on RFI mitigation information. For example, the controller 31 may be configured to determine the RFI mitigation information based on a resistance amount of one or more resistors populated on the circuit board. Alternatively, or additionally, the controller 31 may be configured to determine the RFI mitigation information from a data structure. For example, the controller 31 may be further configured to program the RFI mitigation information in the data structure based on a resistance amount of one or more resistors populated on the circuit board.

In some examples, the data structure may comprise a table that indicates respective amounts of delay to be applied to the respective clock signal pairs. For example, an amount of delay to be stored in an entry of the table for a first clock signal pair (e.g., CLKA/_CLKA) of the two or more clock signal pairs may be based on a distance between the first clock signal pair and a second clock signal pair (e.g., CLKB/_CLKB) of the two or more clock signal pairs (e.g., a pair-to-pair spacing between the first clock signal pair and the second clock signal pair). In some examples, the second clock signal pair may correspond to a noise source and the first clock signal pair may correspond to a noise mitigator, and the amount of delay to be stored in the entry of the table for the first clock signal pair may correspond to a phase shift between the first clock signal pair and the second clock signal pair for destructive interference between the noise source and the noise mitigator at an antenna location relative to a location of the first clock signal pair and the second clock signal pair. For example, clock signal pairs to be designated as noise sources may be located closer to the antenna location relative to clock signal pairs to be designated as noise mitigators, and/or one or more of the clock signal pairs may include a conductive trace on an outermost layer of the circuit board.

In some examples, the memory device 32 may comprise DDR memory. In some examples, the controller 31 may be coupled to a processor 37 and the system 30 may comprise a mobile computing device and may include any of a number of connected devices, peripherals, and/or components, such as at least one of a display 38 communicatively coupled to the processor 37, and a battery 39 coupled to the processor 37, etc.

For example, the controller 31 may be configured as a memory controller. For example, the memory device 32 may be a connected memory device (e.g., a memory module, a dual-inline memory module (DIMM), non-volatile DIMM (NVDIMM), a solid-state drive (SSD), a memory node, etc.). Examples of the circuitry of the controller 31 and/or memory device 32 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Alternatively, or additionally, the circuitry of the controller 31 and/or memory device 32 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALL- TALK, C++, C#, VHDL, Verilog, System C or the like and conventional procedural programming languages, such as the "C" programming language or similar programming languages.

Figure 4A:
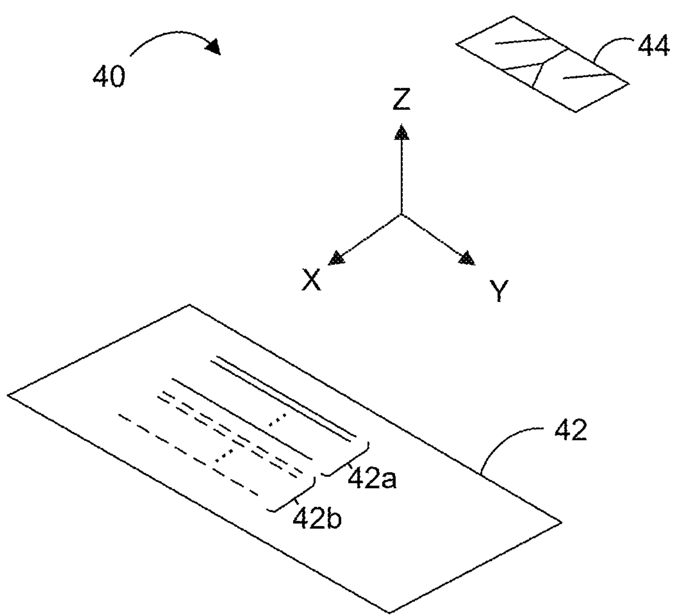
FIGS. 4A and 4B are illustrative diagrams of systems according to examples.
Figure 4B:
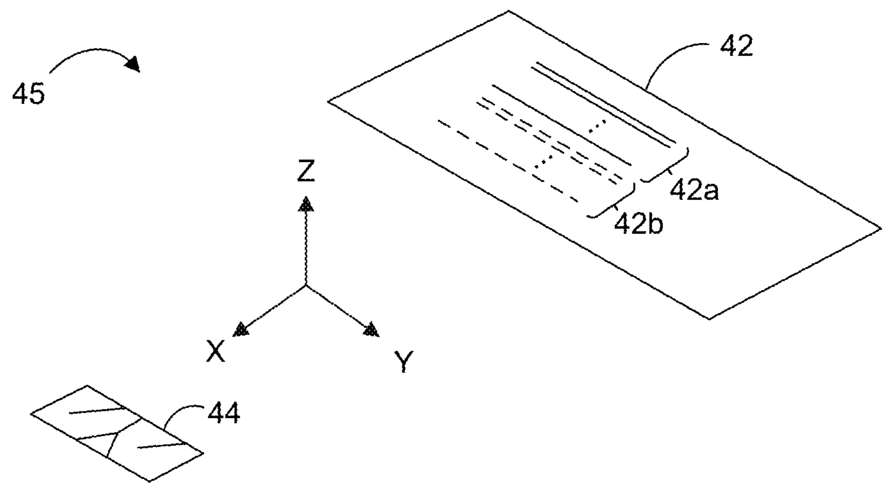

With reference to FIGS. 4A and 4B, examples of two systems 40 and 45 show relative positions of an electronic device 42 and an antenna 44. The electronic device 42 includes signal routing (e.g., clock signal routing, memory signal routing, high-speed IO signal routing, etc.) that includes a first set of signals 42*a* and a second set of signals 42*b*. Although shown as side-by-side in the example systems 40 and 45, the two sets of signals 42*a* and 42*b* may have any suitable arrangement on a PCB of the electronic device 42, including interleaved, symmetrical, asymmetrical, etc. In some examples, with respect to corresponding signals from the two sets 42*a* and 42*b*, signals that are relatively closer to the antenna 44 may be referred to as noise sources while signals that are relatively farther from the antenna 44 may be referred to as noise mitigators.

For the system 40 (FIG. 4A), the first set of signals 42*a* may correspond to the noise sources while the second set of signals 42*b* may correspond to the noise mitigators because the location of the first set of signals 42*a* is closer to the location of the antenna 44 as compared to the second set of signals 42*b*. For the system 45 (FIG. 4B), the second set of signals 42*b* may correspond to the noise sources while the first set of signals 42*a* may correspond to the noise mitigators because the location of the second set of signals 42*b* is closer to the location of the antenna 44 as compared to the first set of signals 42*a*.

In accordance with some examples, a noise source is associated with a noise mitigator and a delay is applied between the noise source and the noise mitigator to phase shift the respective signals to provide suitable destructive interference at the location of the antenna 44. In some examples, the traces are divided into two sets (e.g., based on pseudo-symmetry of the routing from the center) and traces from each set are associated with each other starting with the two closest traces from each set, continuing with the next two closest traces, and so on until the two farthest traces are associated with each other.

Phase shifting is then applied between each of the associated traces. In some examples, phase shifting may be applied on noise mitigator traces relative to noise source traces with an amount of delay (in picoseconds (ps)) that is equal to a constant (with units of ps per millimeter (mm)) times the source to mitigator spacing (in millimeters (mm)):

$$\text{Delay (ps)} = K(\text{ps/mm}) \times \text{source to mitigator spaceing (mm)} \qquad \text{Eq. 1}$$

where the source to mitigator spacing corresponds to the least amount of distance between any two points of the noise source trace(s) and the noise mitigator traces.

In some examples, K equals four (4) divided by the speed of light in a vacuum (0.3 mm/ps):

$$K = 4/0.3\ (\text{mm/ps}) = 13.33\ \text{ps/mm} \qquad \text{Eq. 2}$$

For example, six differential clock pairs (P1 through P6) that are routed side-by-side in numbered sequence on a PCB (e.g., P1 adjacent to P2, P2 adjacent to P3, and so on) may be divided into two sets of signals with one set designated as noise sources (P1 through P3; where P1 through P3 are closer to the antenna location) and the other set designated as noise mitigators (P4 through P6). The noise sources and noise mitigators may be associated with each other starting with the two closest traces (P3 and P4), continuing with the next two closest (P2 and P5), through the two farthest (P1 and P6). For K=13.33, for example, the amount of delay/phase shift to provide suitable destructive interference may be determined as shown in the following table:

TABLE 1

| Noise Source | Noise Mitigator | Spacing | Phase Shift |
|---|---|---|---|
| P1 | P6 | 9 mm | 120 ps |
| P2 | P5 | 6 mm | 80 ps |
| P3 | P4 | 3 mm | 40 ps |

Some examples may include a data structure that stores a delay amount to be applied to each clock pair based on the RFI mitigation information. For example, the values stored in the table may be updated through suitably privileged software/firmware. For the RFI mitigation information from Table 1, for example, a suitable data structure may include a table with six entries as follows:

TABLE 2

| Clock | P1 | P2 | P3 | P4 | P5 | P6 |
|---|---|---|---|---|---|---|
| Delay | 0 | 0 | 0 | 40 | 80 | 120 |

Figure 5:
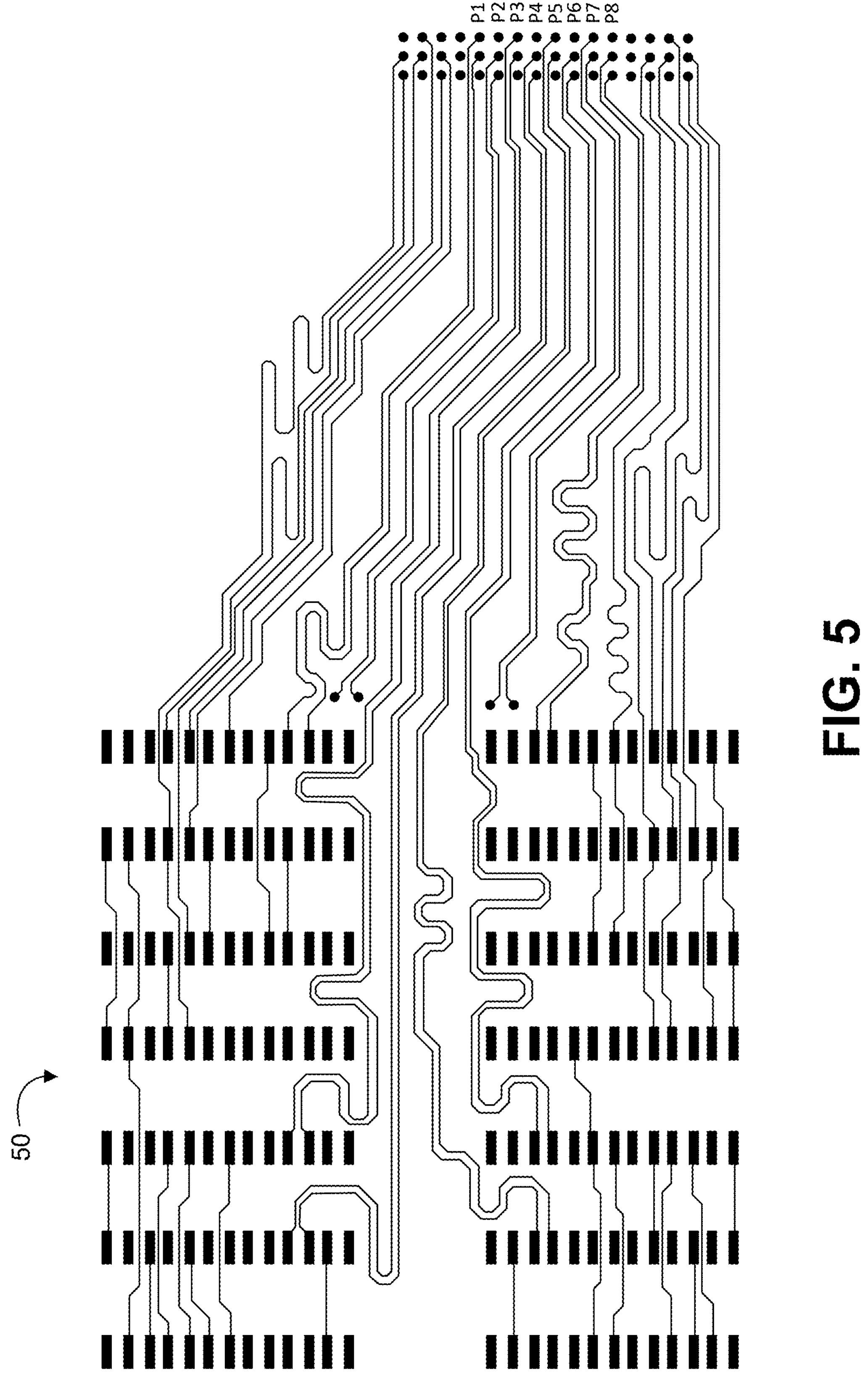
FIGS. 5 and 6 are illustrative diagrams of signal routing for a memory device according to an example.
Figures 6, 7:
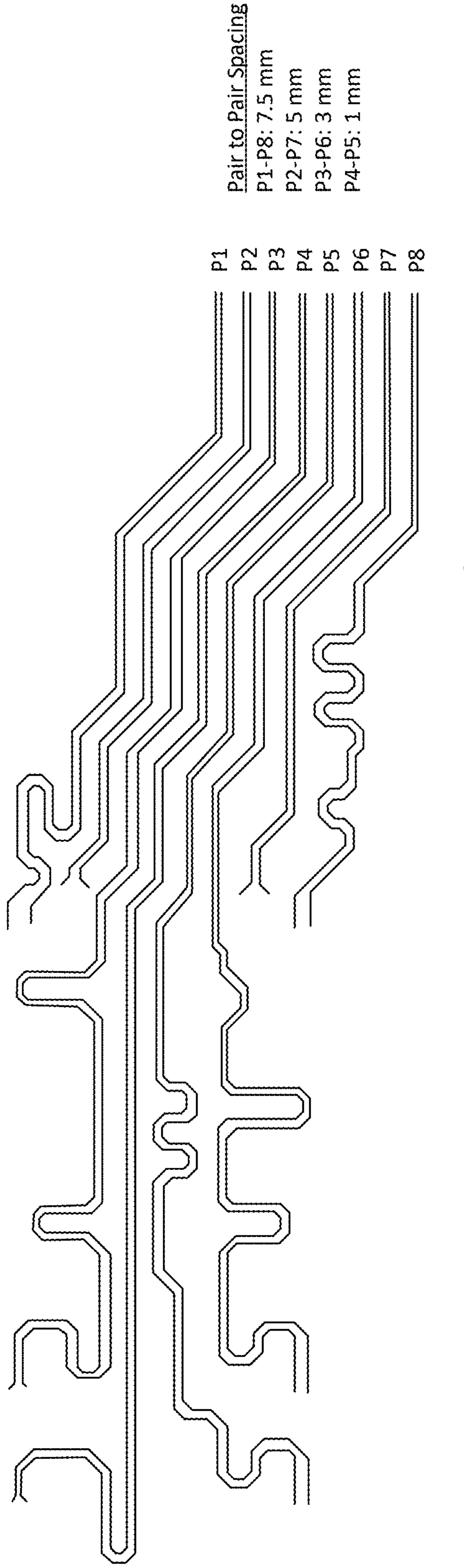
FIG. 7 is an illustrative example of a table of delays according to an example.

FIGS. 5 and 6 show examples of partial signal trace routing for an example DDR memory device 50 with eight (8) differential clock pairs (e.g., P1 through P8). In some examples, the illustrated routing may be disposed on an outermost layer (e.g., a top layer) of a PCB (e.g., to reduce the number of layers and consequently the cost of the PCB and the system/platform that utilizes the PCB). In a conventional system, routing the eight clock pairs on the top layer may increase the RFI risk. In some examples, a system includes suitable phase shifting technology applied to the eight clock pairs such that their wavefronts destructively interfere at an antenna location in the system, advantageously reducing the overall RFI.

FIG. 7 shows an example table 70 of delays for the eight clock pairs P1 through P8 based on the pair-to-pair spacing noted in FIG. 6 (e.g., and K=13.33). In this example, P1 through P4 are designated as noise sources, P5 through P8 are designated as noise mitigators, and a negative delay in the table 70 signifies that the clock pairs are pulled earlier. In a suitably arranged and configured system, applying the phase shifts noted in the table 70 during operation advantageously provides a significant RFI reduction.

In this example, each noise source is associated with a corresponding noise mitigator and the amount of phase shift is determined at least in part based on the pair-to-pair spacing between the associated clock pairs. In some examples, the clock pairs may be associated with each other based on a proximity of the clock pairs and an amount of symmetry between the signal routing. As shown in FIG. 6, in this example the two closest clock pairs (the noise source P4 and the noise mitigator P5) are associated with each other, the next two closest clock pairs (the noise source P3 and the noise mitigator P6) are associated with each other, the next two closest clock pairs (the noise source P2 and the noise mitigator P5) are associated with each other, and the two farthest clock pairs (the noise source P1 and the noise mitigator P8) are associated with each other. Nominal examples of pair-to-pair spacing for each of the associated noise sources and noise mitigators are shown in FIG. 6 as: P1-P8: 7.5 mm; P2-P7: 5 mm; P3-P6: 3 mm; and P4-P5: 1 mm. The above equations 1 and 2 are then applied to determine the amount of delay for the noise mitigators entered in the table 70.

During system setup, configuration information may be programmed with the RFI mitigation information from the table 70. In some examples, resistors may be populated or depopulated on a PCB in the system (e.g., the PCB with the clock pairs) to indicate and/or apply the desired amount(s) of delay. Additionally, or alternatively, a suitable memory structure (e.g., ROM, PROM, a configuration register, etc.) may be programmed to indicate the desired amount(s) of delay. During operation, suitable hardware, software, and/or firmware may sense the presence and/or resistance amounts of the populated resistors, and/or may read the memory structure at power-on, and apply the indicated amounts of delay to the respective clock pairs. The foregoing examples are illustrative only. Given the benefit of the present description and figures, those skilled in the art will appreciate that numerous other techniques may be utilized to implement other examples of the RFI mitigation technology described herein.

Figure 8:
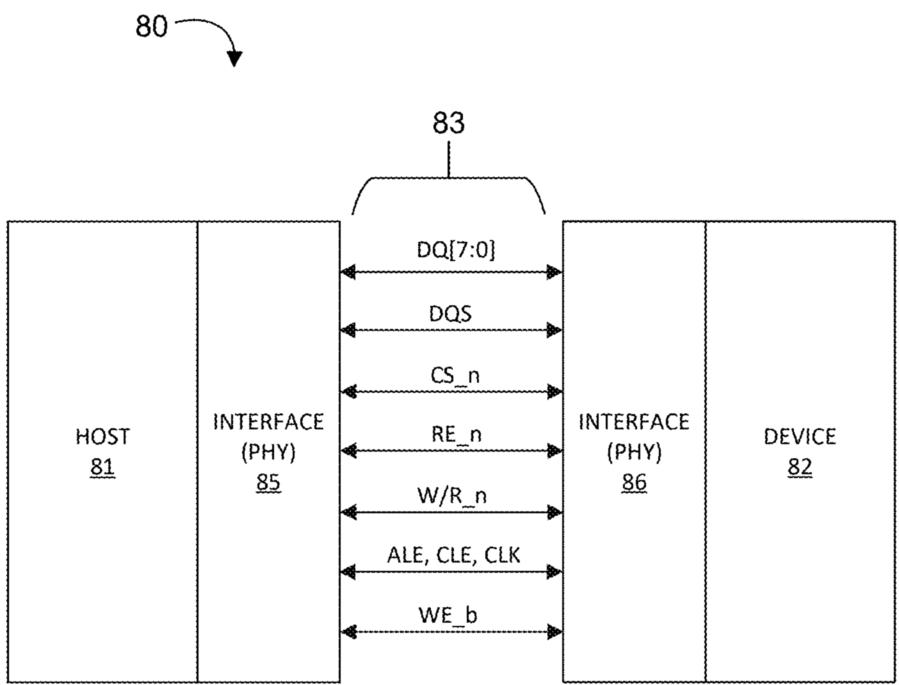
FIG. 8 shows an apparatus including a host, a device, and a channel between the host and device, according to some examples described herein.

FIG. 8 shows an apparatus 80 including a host 81, a device 82, and a channel 83 between host 81 and device 82, according to some embodiments described herein. Host 81 may include or may be included in a processor (e.g., a general-purpose processor, or an application-specific integrated circuit (ASIC)), a computer (e.g., a server), a networking device, a computer storage system, or other electronic devices or systems. Device 82 may include a memory device (e.g., a DDR memory device), an interface device (e.g., an interface chip), a repeater, a retimer, or other devices. Channel 83 may include conductive paths to carry signals that are communicated between host 81 and device 82. The conductive paths of channel 83 may include metal wires (e.g., metal traces on a circuit board). As shown in FIG. 8, host 81 and device 82 may include interfaces 85 and 86, respectively, coupled to channel 83. Each of interfaces 85 and 86 may include circuitry (e.g., physical layer (PHY) circuitry) to transmit and receive signals through channel 83.

Host 81 and device 82 may communicate with each other to exchange information (e.g., data, clock, and control information) in the form of signals. Examples of such signals include CE_b (chip enable signal), CLE (command latch enable), ALE (address latch enable), CLK (clock signal), WE_b (write enable), RE/RE_b (read enable), W/R_n (read/write direction), DQ (data signals), and DQS (strobe signals). In some implementations, the signals shown in FIG. 8 between host 81 and device 82 (e.g., and signals shown in other figures in this description) may be based on a DDR specification. One skilled in the art would readily recognize that host 81 and device 82 may communicate with each using other signals (not shown). The device 82 may include any suitable read training circuitry and DCD compensation circuitry to improve AC timing margins on the data read output path. The device 82 may further include the technology described herein for RFI mitigation. In particular, the device 82 may include any of the devices described below with reference to FIG. 9 through FIG. 12.

Figure 9:
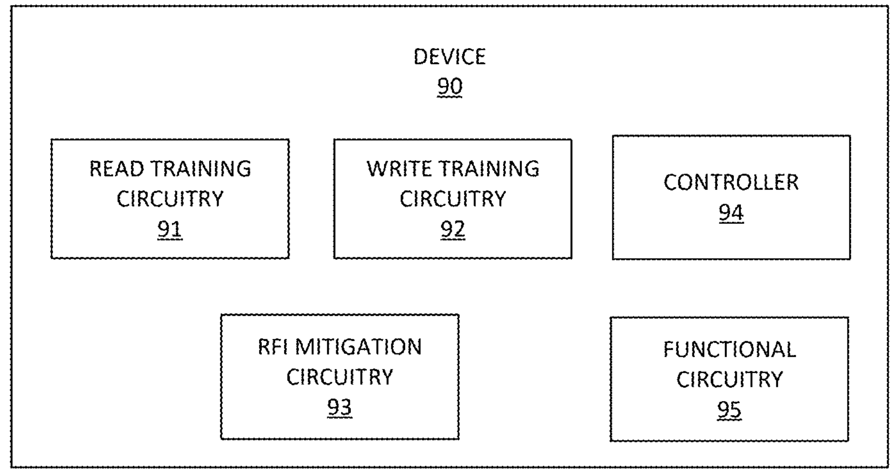
FIG. 9 shows a device including read training circuitry, write training circuitry, and RFI mitigation circuitry, according to some examples described herein.

FIG. 9 shows an example of a device 90 including read training circuitry 91, write training circuitry 92, and RFI mitigation circuitry 93. Device 90 may further include a controller 94 and functional circuitry 95 specific to the device 90. For example, the controller 94 and functional circuitry 95 may be configured to implement a memory device (e.g., a DDR memory device, a flash memory device, etc.), an interface device (e.g., an interface chip), a repeater, a retimer, or other devices with high speed IO interfaces. Read training circuitry 91 may be any suitable circuitry configured to improve AC timing margins on a data read output path for the device 90. Write training circuitry 92 may include any suitable circuitry to improve AC timing margins on a data write input path for the device 90. The RFI mitigation circuitry 93 may include any of the various features or aspects of the examples described herein to reduce RFI at an antenna location.

Figure 10:
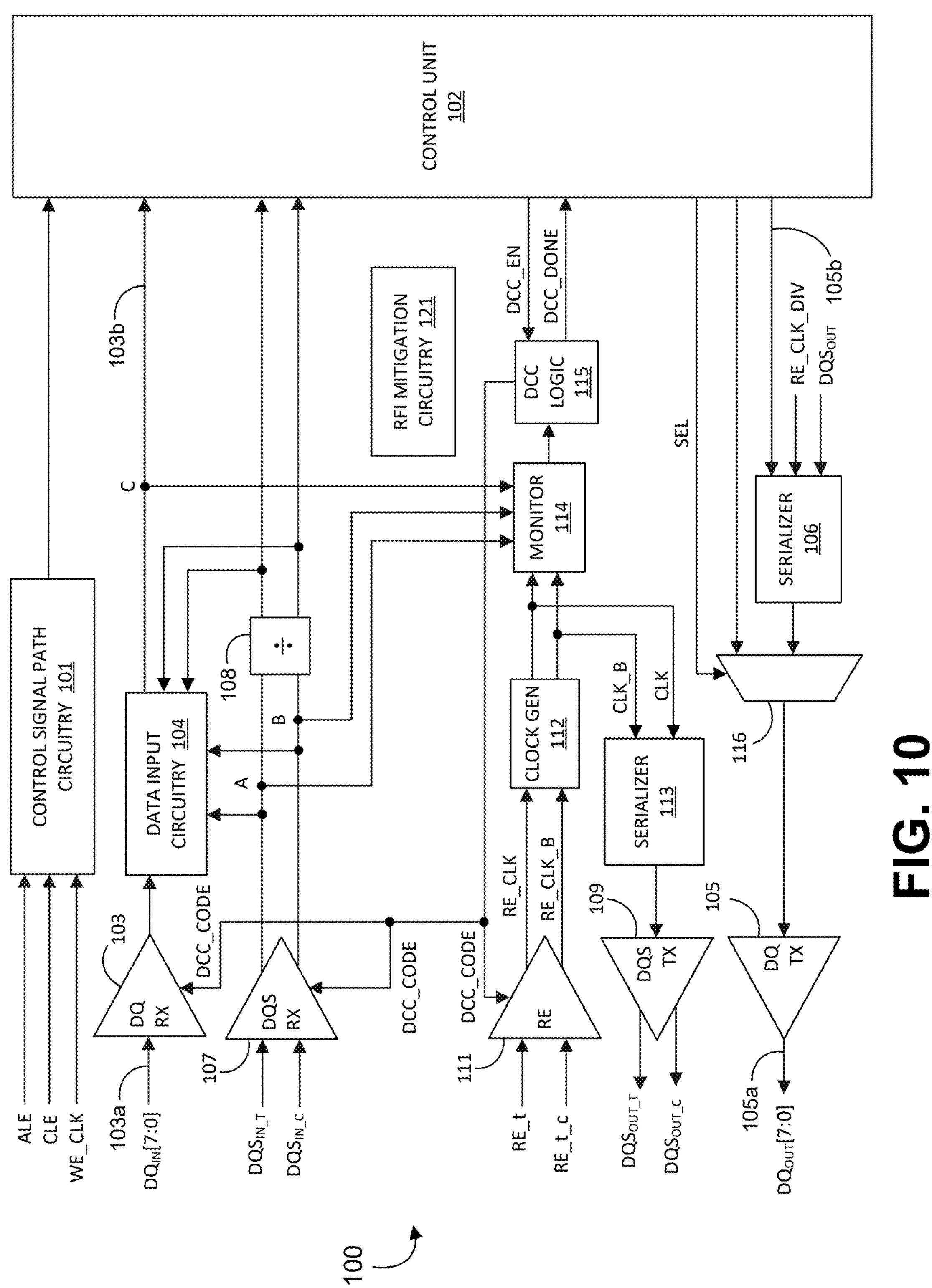
FIG. 10 shows another device including read training circuitry, write training circuitry, and RFI mitigation circuitry, according to some examples described herein.

FIG. 10 shows a device 100 including read training circuitry, write training circuitry, and DCC circuitry, according to some examples described herein. As shown in FIG. 10, device 100 may receive signals that are similar to those described above with reference to FIG. 8, including signals CE_b, CLE, ALE, CLK, WE_b, RE/RE_b, W/R_n, DQin [7:0], DQout [7:0]. DQSin_t, and DQSin_c, DQSout_t, and DQSout_c. Signals DQin [7:0] and DQout [7:0] may be represented by signals DQ of FIG. 8. Signals DQSin_t, and DQSin_c, DQSout_t, and DQSout_c may be represented by signals DQS of FIG. 8.

As shown in FIG. 10, device 100 may include control signal path circuitry 101 (e.g., that may include components such as buffers and latches) to provide signals CE_b, ALE, CLE, and WE_b to control unit 102. Device 100 may perform IO operations (e.g., read, write, read link training, write link training, DCC calibration, etc.) based on timing (e.g., signal levels) of signals CE_b, CLE, ALE, CLK, WE_b, and RE/RE_b.

Device 100 may include DQ buffer (e.g., input data buffer (receiver (RX)) 103 to receive data signals (e.g., input data signals) DQin [7:0] from another device (e.g., host 81). Data signals DQin [7:0] may be provided to device 100 during a write operation of device 100. Device 100 may include input circuitry 104 to provide data signals DQin [7:0] (from DQ buffer 103) to control unit 102. Data signals DQin [7:0] may include eight bits (e.g., bit 0 through bit 7 (denotes as [7:0])) that may be provided concurrently (e.g., transferred in parallel) on paths (circuit paths) 103*a* and 103*b*. Thus, DQ buffer 103 may include eight separate receiver circuits to concurrently receive (e.g., receive in parallel) eight bits carried by (included in) signals DQin [7:0]. Input circuitry 104 may include a serial-in parallel-out (SIPO) circuit to receive signals DQin [7:0] from DQ buffer 103 and provide them to path 103*b*. Thus, each of paths 103*a* and 103*b* may include eight separate circuit paths to concurrently carry the bits (e.g., eight bits) of data signals DQin [7:0].

Device 100 may include DQ buffer (e.g., output data buffer (transmitter (TX))) 105 to provide data signals (e.g., output data signals) DQout [7:0] to another device (e.g., host 81). Data signals DQout [7:0] may be provided by device 100 during a read operation of device 100. Device 100 may include output circuitry to receive data signals DQout [7:0] (from internal components (e.g., memory circuit such as a first-in-first-out (FIFO) buffer)) and provide data signals DQout [7:0] to DQ buffer 105. Data signals DQout [7:0] may include eight bits (e.g., bit 0 through bit 7 (denoted as [7:0])) that may be provided concurrently (e.g., transferred in parallel) on paths (circuit paths) 105*a* and 105*b*. Thus, DQ buffer 105 may include eight separate receiver circuits to concurrently receive (e.g., receive in parallel) eight bits carried by (included in) signals DQout [7:0]. Output circuitry may include a serializer 106 (e.g., including a parallel-in serial-out (PISO) circuit) to receive signals DQout [7:0] on path 105*b* from internal components of device 100. Thus, each of paths 105*a* and 105*b* may include eight separate circuit paths to concurrently carry the bits (e.g., eight bits) of data signals DQout [7:0].

FIG. 10 shows each data signal DQin [7:0] and DQout [7:0] including eight bits (e.g., bit 0 through bit 7) as an example. However, the number of bits concurrently carried by data signals DQin [7:0] may vary, and the number of bits of concurrently carried by data signals DQout [7:0] may vary. For example, data signals DQin [7:0] may carry 16 bits in parallel, and data signals DQout [7:0] may carry 16 bits in parallel.

As shown in FIG. 10, device 100 may include DQS buffer (e.g., input strobe buffer (receiver (RX))) 107 to receive strobe signals (e.g., input strobe signals) DQSin_t and DQSin_c from another device (e.g., host 81). Strobe signals DQSin_t and DQSin_c may be true and complement signals (two separate clock signals). Strobe signals DQSin_t and DQSin_c may be provided to device 100 during a write operation. DQS buffer 107 may generate clock signals CLK and CLK_B that may have the same frequency as strobe signals DQSout_t and DQSout_c. Device 100 may receive data signals DQin [7:0] based on timing of clock signals CLK and CLK_B. Device 100 may include a divider (e.g., divided by four) 108 to divide clock signals CLK and CLK_B. Input circuitry 104 may use the divided clock signals (not shown) at the output of divider 108 to sample data signals DQin [7:0] and provide them to control unit 102.

Device 100 may include DQS buffer (e.g., strobe output buffer (transmitter (TX))) 109 to provide strobe signals (e.g., output strobe signals) DQSout_t and DQSout_c to another device (e.g., host 81). Strobe signals DQSout_t and DQSout_c may be true and complement signals (two separate clock signals). Strobe signals DQSout_t and DQSout_c may be provided by device 100 to another device (e.g., host 81) during a read operation. Another device (e.g., host 81) may receive data signals DQout [7:0] from device 100 on timing of strobe signals DQSout_t and DQSout_c.

DQ buffers 103 and 105 and DQS buffers 107 and 109 may be part of an interface (e.g., PHY) of device 100 to allow communication (e.g., transferring of signals) to and from device 100. The read training circuitry may include further suitable circuitry (not shown) such as read calibration logic, clock generators, pattern generators, etc. to support a read link training mode.

The device 100 further includes DCD compensation circuitry that may include RE buffer (e.g., input buffer (receiver (RX)) 111 to receive signals (complementary read enable signals) RE_t and RE_t_c and generate clock signals (complementary signals) RE_CLK and RE_CLK_B based on signals RE_t and RE_t_c. The DCD compensation circuitry may also include a clock generator 112 to generate clock signals (complementary signals) CLK and CLK_B based on signals RE_CLK and RE_CLK_B. Clock signals (complementary signals) CLK and CLK_B may be used to generate strobe signals DQSout_t and DQSout_c, respectively. For example, clock signals CLK and CLK_B may be provided to DQS buffer 109 through a serializer 113 and DQS buffer 109 may operate to provide signals (complementary signals) DQSout_t and DQSout_c based on clock signals CLK and CLK_B. Device 100 may send (e.g., send to host 81) data signals DQSOUT [7:0] and strobe signals DQSout_t and DQSout_c during a read operation of the device 100.

As shown in FIG. 10, the DCD compensation circuitry may include a monitor 114 and DCC logic 115 (e.g., logic circuitry). The control unit 102 that may operate to detect the levels of signals ALE and CLE that indicate a command (e.g., request by a host) has been issued to device 100 to cause device 100 to perform a DCC calibration operation. Based on the detection, control unit 102 may enable (e.g., by using information DCC_EN) DCC logic 115 to detect the toggling of signals RE_t and RE_t_c (e.g., by monitoring clock signals CLK and CLK_B) and begin part of the DCC calibration operation. DCC logic 115 may provide information DCC_DONE to control unit 102 when the DCC calibration operation is done.

Monitor 114 may operate to detect the toggling of signals RE_t and RE_t_c (e.g., by monitoring the levels of clock signals CLK and CLK_B). Monitor 114 may compare the average value (e.g., average voltage value) of clock signals CLK and CLK_B with a reference voltage. Because clock signals CLK and CLK_B are generated based on signals RE_CLK and RE_CLK_B, the average of clock signals CLK and CLK_B may also be the average of signals RE_CLK and RE_CLK_B. Further, because signals RE_CLK and RE_CLK_B are generated based on signals RE_t and RE_t_c, the average of signals RE_CLK and RE_CLK_B may also be the average of signals RE_t and RE_t_c. Thus, the average of clock signals CLK/CLK_B, the average of signals RE_CLK/RE_CLK_B, and the average of signals RE_t and RE_t_c may have the same relationship with a specific (e.g., predetermined) reference value. For example, the average of each of clock signals CLK/CLK_B, signals RE_CLK/RE_CLK_B, and signals RE_t and RE_t_c may be less than a reference value. In another example, the average of each of signals CLK/CLK_B, signals RE_CLK/RE_CLK_B, and signals RE_t and RE_t_c may be equal to a reference value. In a further example, the average each of clock signals CLK/CLK_B, signals RE_CLK/RE_CLK_B, and signals RE_t and RE_t_c may be greater than a reference value.

Monitor 114 may further operate to detect the toggling of signals DQSin_t and DQSin_t_c (e.g., by monitoring the levels of signals A and B output from the buffer 107). Monitor 114 may compare the average value (e.g., average voltage value) of signals A and B with a reference voltage. Because signals A and B are generated based on signals DQSin_t and DQSin_t_c, the average of monitored signals A and B may closely correspond to the average of signals DQSin_t and DQSin_t_c. Thus, the average of monitored signals A and B, and the average of signals DQSin_t and DQSin_t_c, may have the same relationship with a specific (e.g., predetermined) reference value. For example, the average of each of monitored signals A and B, and the average of signals DQSin_t and DQSin_t_c may be less than a reference value, may be equal to the reference value, and/or may be greater than the reference value.

Monitor 114 may further operate to detect the toggling of signals DQSin[7:0] (e.g., by monitoring the levels of signal C from the input circuitry 104). Monitor 114 may compare the average value (e.g., average voltage value) of signal C with a reference voltage. Because signal C is generated based on signals DQin[7:0], the average of monitored signal C may closely correspond to the average of signals DQin [7:0]. Thus, the average of monitored signal C, and the average of signals DQin[7:0], may have the same relationship with a specific (e.g., predetermined) reference value. For example, the average of each of monitored signal C and the average of signals DQin[7:0] may be less than a reference value, may be equal to the reference value, and/or may be greater than the reference value.

As shown in FIG. 10, the DCD compensation circuitry may include DCC logic (e.g., circuitry) 115 to control (e.g., adjust) the RE buffer 111, the DQ buffer 103, and the DQS buffer 107 based on the result of the comparison performed by monitor 114. As mentioned above, monitor 114 may compare the average values of the monitored signals with respective reference voltages and provide the result of the comparison. Based on the result of the comparisons, the DCC logic 115 may adjust the respective buffers to reduce or eliminate duty cycle distortion of the monitored signals CLK, CLK_B, A, B, and C so that the values of the monitored signals are within an acceptable duty cycle value (e.g., predetermined respective values). As an example, DCC logic 115 may adjust each of the RE buffer 111, the DQ buffer 103, and the DQS buffer 107 by providing different values for a code DCC_CODE (a digital code that may include multiple bits) to decrease, hold (keep the same), or increase the frequency of the various signals (which are used to generate the monitored signals) until the monitor 114 determines (e.g., based on the result of the comparison) that the values (e.g., average values) of the monitored signals are within an acceptable duty cycle value.

In some examples, the device 100 may further include additional compensation circuitry (not shown) to adjust the frequency of a signal OSC (an internal oscillating) that may be internally generated by an internal oscillator (e.g., a local ring oscillator). The frequency of signal OSC may be set (e.g., programmed) to be N times (where N is a real number) the frequency of clock signals CLK and CLK_B (which is also N times the frequency of signals RE_t and RE_t_c). The additional compensation circuitry may include a frequency detector that may operate to determine (e.g., compare) the relationship between the frequency of clock signals CLK and CLK_B and frequency of signal OSC. The additional compensation circuitry may include a control circuit (which may include a finite state machine (FSM)) that may operate to control (e.g., adjust) the frequency of signal OSC based on the relationship between the frequency of clock signals CLK and CLK_B and frequency of signal OSC. For example, the control circuit may use different values of a code OSC_CODE (digital code) to control the internal oscillator in order to decrease, hold (keep the same), or increase the frequency of signal OSC, such that the frequency of signal OSC may be N times (e.g., a predetermined value) frequency of clock signals CLK and CLK_B.

In some examples, the device 100 may also include a multiplexer 116 that may respond to select information (e.g., signal) SEL to selectively provide output data DQout [7:0] to DQ buffer 105. Data signals DQout [7:0] may be either data signals DQ [0:7] from control unit 102 or serialized data signals from a serializer 106.

In some examples, the device 100 further includes RFI mitigation circuitry 121. The RFI mitigation circuitry 121 may be configured to apply delays to the various clock signals of the device 100 to reduce RFI at an antenna location.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 11:
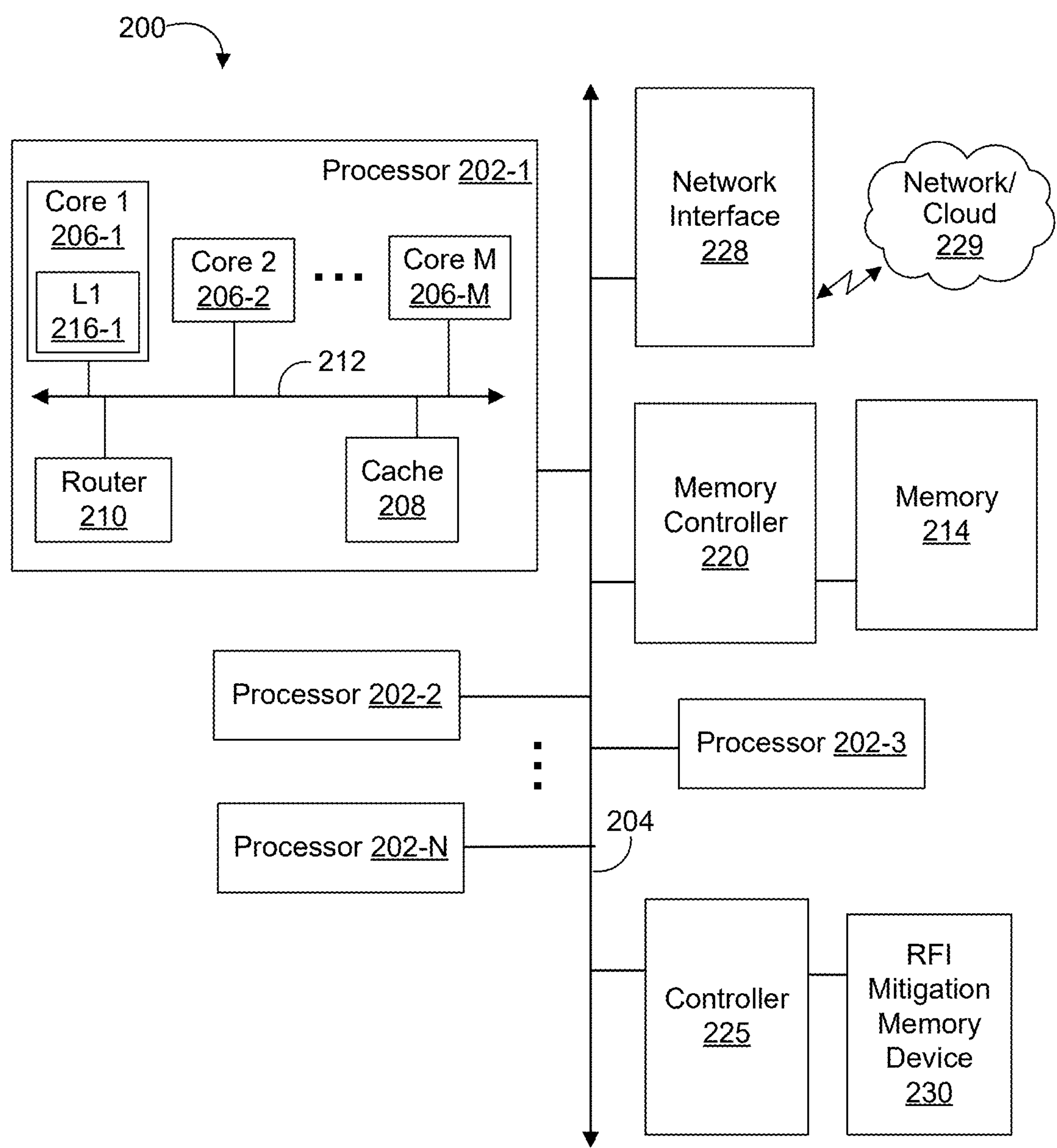
FIG. 11 is a block diagram of an example of a computing system according to an example.

Turning now to FIG. 11, an example of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some examples, the processor 202-1 may include one or more processor cores 206-1 through 206-M (referred to herein as "cores 206," or more generally as "core 206"), a cache 208 (which may be a shared cache or a private cache in various examples), and/or a router 210. The processor cores 206 may be implemented on a single integrated circuit (IC) chip. Moreover, the chip may include one or more shared and/or private caches (such as cache 208), buses or interconnections (such as a bus or interconnection 212), memory controllers, or other components.

In some examples, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 11, the memory 214 may be in communication with the processors 202 via the interconnection 204. In some examples, the cache 208 (that may be shared) may have various levels, for example, the cache 208 may be a mid-level cache and/or a last-level cache (LLC). Also, each of the cores 206 may include a level 1 (L1) cache 216-1 (e.g., and a level 2 (L2) cache, not shown)). Various components of the processor 202-1 may communicate with the cache 208 directly, through a bus (e.g., the bus 212), and/or a memory controller or hub.

As shown in FIG. 11, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some examples. Alternatively, memory 214 may include byte-addressable non-volatile memory such as INTEL OPTANE technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include memory such as a RFI mitigation memory device 230 coupled to the interconnect 204 via controller 225. Hence, controller 225 may control access by various components of system 200 to the RFI mitigation memory device 230. Furthermore, even though controller 225 is shown to be directly coupled to the interconnection 204 in FIG. 11, controller 225 may alternatively communicate via a memory/storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 200 (for example where the memory bus is coupled to interconnect 204 via some other logic like a bus bridge, chipset, etc.) Additionally, controller 225 may be incorporated into memory controller logic or provided on a same integrated circuit (IC) device in various examples (e.g., on the same circuit board device as the RFI mitigation memory device 230 or in the same enclosure as the RFI mitigation memory device 230).

Furthermore, controller 225 and/or RFI mitigation memory device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, RFI mitigation memory device 230, SSD bus, SATA bus, controller 225, etc., to sense variations in various factors affecting power/thermal behavior of the system/platform, such as temperature, operating frequency, operating voltage, power consumption, and/or inter-core communication activity, etc. Other high-speed IO devices in the system 200, such as the memory 214, the network interface 228, etc., may similarly incorporate one or more aspects of RFI mitigation technology as described herein.

Figure 12:
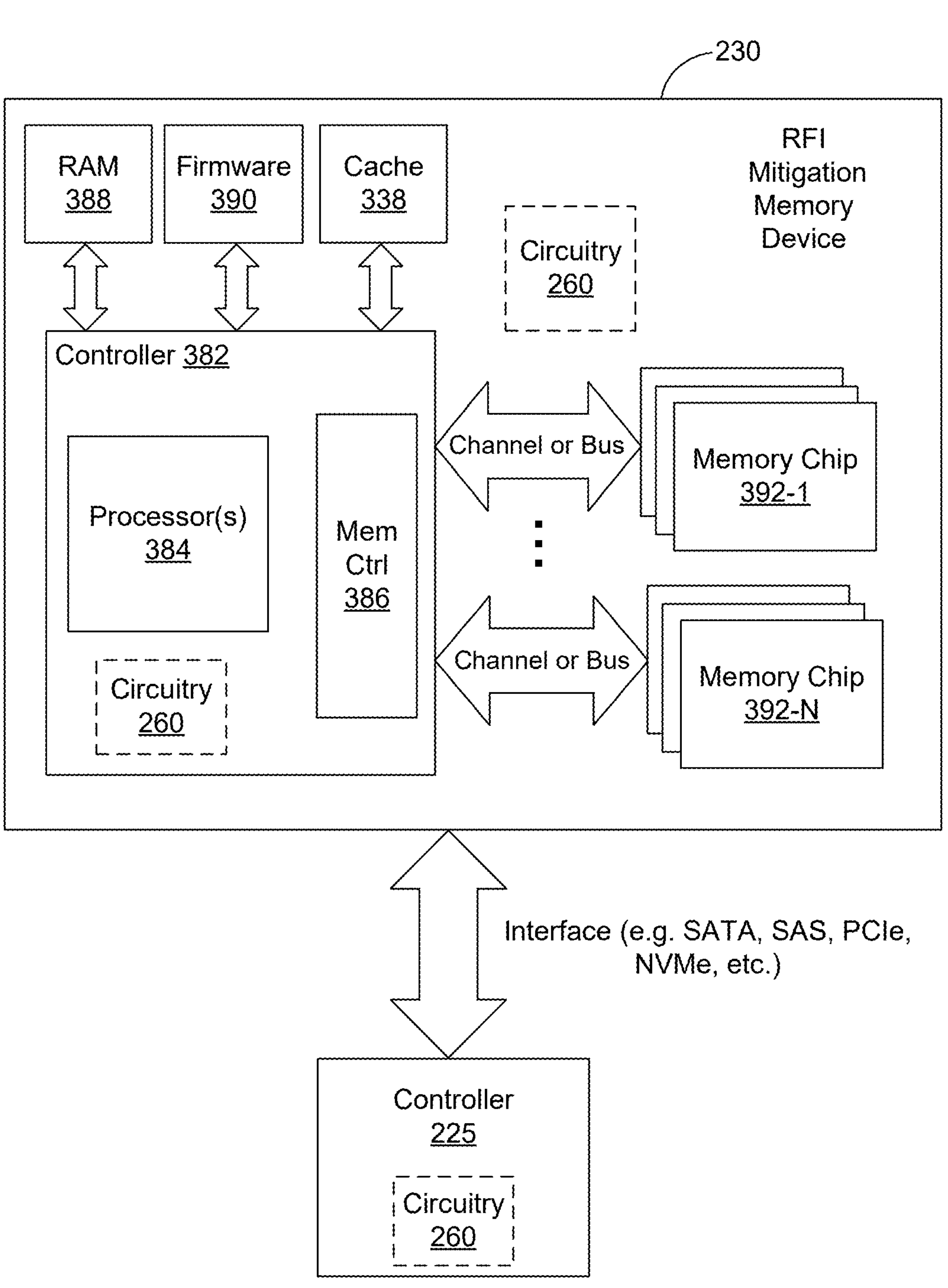
FIG. 12 is a block diagram of an example of an RFI mitigation memory device according to an example.

FIG. 12 illustrates a block diagram of various components of the device 230, according to an example. As illustrated in FIG. 12, circuitry 260 may be located in various locations such as inside the device 230 or controller 225. The device 230 includes a controller 382 (which in turn includes one or more processor cores or processors 384 and memory controller logic 386), cache 338, RAM 388, firmware storage 390, and one or more memory dice 392-1 to 392-N (collectively memory 392). The memory 392 is coupled to the memory controller logic 386 via one or more memory channels or busses. Also, device 230 communicates with controller 225 via an interface (such as a SATA, SAS, PCIe, NVMe, etc., interface). Processors 384 and/or controller 382 may compress/decompress data written to or read from the memory dice 392-1 to 392-N.

As illustrated in FIG. 12, the device 230 may include circuitry 260, which may be in the same enclosure as the device 230 and/or fully integrated on a printed circuit board (PCB) of the device 230. One or more of the features/aspects/operations discussed with reference to FIGS. 1-10 may be performed by one or more of the components of FIG. 12. Also, one or more of the features/aspects/operations of FIGS. 1-10 may be programmed into the firmware 390. Further, controller 225 may also include circuitry 260. Advantageously, the circuitry 260 may include technology to implement one or more aspects of the apparatus 10 (FIG. 1), the device 20 (FIG. 2), the system 30 (FIG. 3), the system 40 (FIG. 4A), the system 45 (FIG. 4B), the device 50 (FIG. 5), the table 70 (FIG. 7), the apparatus 80 (FIG. 8), the device 90 (FIG. 9), the device 100 (FIG. 10), and/or any of the features discussed herein.

For example, the controller 382 may be configured to control access to the memory 392, and the circuitry 260 may be configured to apply a phase shift between respective clock signal pairs of two or more clock signal pairs for the memory 392 based on RFI mitigation information. For example, the controller 382 may be configured to determine the RFI mitigation information based on a resistance amount of one or more resistors populated on a circuit board. Alternatively, or additionally, the controller 382 may be configured to determine the RFI mitigation information from a data structure. For example, the controller 382 may be further configured to program the RFI mitigation information in the data structure based on a resistance amount of one or more resistors populated on the circuit board. For example, the memory 392 may include floating gate DDR memory, NAND memory, etc.

In some examples, the data structure may comprise a table that indicates respective amounts of delay to be applied to the respective clock signal pairs. For example, an amount of delay to be stored in an entry of the table for a first clock signal pair (e.g., CLKA/_CLKA) of the two or more clock signal pairs may be based on a distance between the first clock signal pair and a second clock signal pair (e.g., CLKB/_CLKB) of the two or more clock signal pairs (e.g., a pair-to-pair spacing between the first clock signal pair and the second clock signal pair). In some examples, the second clock signal pair may correspond to a noise source and the first clock signal pair may correspond to a noise mitigator, and the amount of delay to be stored in the entry of the table for the first clock signal pair may correspond to a phase shift between the first clock signal pair and the second clock signal pair for destructive interference between the noise source and the noise mitigator at an antenna location relative to a location of the first clock signal pair and the second clock signal pair. For example, clock signal pairs to be designated as noise sources may be located closer to the antenna location relative to clock signal pairs to be designated as noise mitigators, and/or one or more of the clock signal pairs may include a conductive trace on an outermost layer of the circuit board.

Those skilled in the art will appreciate that a wide variety of devices may benefit from the foregoing examples. The following exemplary core architectures, processors, and computer architectures are non-limiting examples of devices that may beneficially incorporate examples of the technology described herein.

Additional Notes and Examples

Example 1 include an apparatus, comprising first circuitry to provide a first set of one or more signals and a second set of one or more signals for an electronic device, and second circuitry coupled to one or more of the first circuitry, the first set, and the second set to provide a delay between respective signals of the first and second sets based on RFI mitigation information associated with the respective signals.

Example 2 include the apparatus of Example 1, wherein the second circuitry is further to determine the RFI mitigation information from a configuration structure.

Example 3 include the apparatus of Example 2, wherein the configuration structure includes a data structure to store a table that indicates respective amounts of delay to be applied to the respective signals of the first and second sets.

Example 4 include the apparatus of Example 3, wherein the first set comprises signals to be designated as noise sources and the second set comprises signals to be designated as noise mitigators, and wherein the data structure is further to store respective amounts of delay that corresponds to destructive interference between the noise sources and the noise mitigators at an antenna location relative to a location of the respective signals of the first and second sets.

Example 5 include the apparatus of Example 4, wherein the signals designated as noise sources are to be located closer to the antenna location relative to the signals to be designated as noise mitigators.

Example 6 include the apparatus of any of Examples 1 to 5, wherein one or more of the respective signals are to correspond to a signal that includes a conductive trace on an outermost layer of a circuit board.

Example 7 include the apparatus of any of Examples 1 to 6, wherein the electronic device comprises a memory device.

Example 8 include a memory device, comprising a circuit board, memory on the circuit board, and interface circuitry on the circuit board coupled to the memory to provide a plurality of output data read paths and a plurality of input data write paths for the memory, wherein the interface circuitry further comprises two or more clock signal pairs for the memory, and RFI mitigation circuitry coupled to the two or more clock signal pairs to provide a phase shift between respective clock signal pairs based on configuration information.

Example 9 include the memory device of Example 8, wherein the interface circuitry is further to determine the configuration information based on a resistance amount of one or more resistors populated on the circuit board.

Example 10 include the memory device of any of Examples 8 to 9, wherein the interface circuitry is further to determine the configuration information from a data structure.

Example 11 include the memory device of Example 10, wherein the interface circuitry is further to program the configuration information in the data structure based on a resistance amount of one or more resistors populated on the circuit board.

Example 12 include the memory device of any of Examples 10 to 11, wherein the data structure comprises a table that indicates respective amounts of delay to be applied to the respective clock signal pairs.

Example 13 include the memory device of Example 12, wherein an amount of delay to be stored in an entry of the table for a first clock signal pair of the two or more clock signal pairs is based on a distance between the first clock signal pair and a second clock signal pair of the two or more clock signal pairs (e.g., a pair-to-pair spacing).

Example 14 include the memory device of Example 13, wherein the second clock signal pair corresponds to a noise source and the first clock signal pair corresponds to a noise mitigator, and wherein the amount of delay to be stored in the entry of the table for the first clock signal pair corresponds to a phase shift between the first clock signal pair and the second clock signal pair for destructive interference between the noise source and the noise mitigator at an antenna location relative to a location of the first clock signal pair and the second clock signal pair.

Example 15 include the memory device of Example 14, wherein clock signal pairs to be designated as noise sources are to be located closer to the antenna location relative to clock signal pairs to be designated as noise mitigators.

Example 16 include the memory device of any of Examples 8 to 15, wherein one or more of the two or more clock signal pairs includes a conductive trace on an outermost layer of the circuit board.

Example 17 include a system, comprising a controller, and a memory device coupled to the controller, the memory device comprising a circuit board, memory on the circuit board, and two or more clock signal pairs for the memory, wherein the controller is to apply a phase shift between respective clock signal pairs of the two or more clock signal pairs for the memory based on RFI mitigation information.

Example 18 include the system of Example 17, wherein the controller is further to determine the RFI mitigation information based on a resistance amount of one or more resistors populated on the circuit board.

Example 19 include the system of any of Examples 17 to 18, wherein the controller is further to determine the RFI mitigation information from a data structure.

Example 20 include the system of Example 19, wherein the controller is further to program the RFI mitigation information in the data structure based on a resistance amount of one or more resistors populated on the circuit board.

Example 21 include the system of any of Examples 19 to 20, wherein the data structure comprises a table that indicates respective amounts of delay to be applied to the respective clock signal pairs.

Example 22 include the system of Example 21, wherein an amount of delay to be stored in an entry of the table for a first clock signal pair of the two or more clock signal pairs is based on a distance between the first clock signal pair and a second clock signal pair of the two or more clock signal pairs (e.g., a pair-to-pair spacing).

Example 23 include the system of Example 22, wherein the second clock signal pair corresponds to a noise source and the first clock signal pair corresponds to a noise mitigator, and wherein the amount of delay to be stored in the entry of the table for the first clock signal pair corresponds to a phase shift between the first clock signal pair and the second clock signal pair for destructive interference between the noise source and the noise mitigator at an antenna location relative to a location of the first clock signal pair and the second clock signal pair.

Example 24 include the system of Example 23, wherein clock signal pairs to be designated as noise sources are to be located closer to the antenna location relative to clock signal pairs to be designated as noise mitigators.

Example 25 include the system of any of Examples 17 to 24, wherein one or more of the clock signal pairs includes a conductive trace on an outermost layer of the circuit board.

Example 26 include a method, comprising controlling a memory that includes two or more clock signal pairs for the memory, and applying a phase shift between respective clock signal pairs of the two or more clock signal pairs for the memory based on RFI mitigation information.

Example 27 include the method of Example 26, further comprising determining the RFI mitigation information based on a resistance amount of one or more resistors populated on a circuit board.

Example 28 include the method of any of Examples 26 to 27, further comprising determining the RFI mitigation information from a data structure.

Example 29 include the method of Example 28, further comprising programming the RFI mitigation information in the data structure based on a resistance amount of one or more resistors populated on a circuit board.

Example 30 include the method of any of Examples 28 to 29, wherein the data structure comprises a table that indicates respective amounts of delay to be applied to the respective clock signal pairs.

Example 31 include the method of Example 30, wherein an amount of delay to be stored in an entry of the table for a first clock signal pair of the two or more clock signal pairs is based on a distance between the first clock signal pair and a second clock signal pair of the two or more clock signal pairs (e.g., a pair-to-pair spacing).

Example 32 include the method of Example 31, wherein the second clock signal pair corresponds to a noise source and the first clock signal pair corresponds to a noise mitigator, and wherein the amount of delay to be stored in the entry of the table for the first clock signal pair corresponds to a phase shift between the first clock signal pair and the second clock signal pair for destructive interference between the noise source and the noise mitigator at an antenna location relative to a location of the first clock signal pair and the second clock signal pair.

Example 33 include the method of Example 32, wherein clock signal pairs to be designated as noise sources are to be located closer to the antenna location relative to clock signal pairs to be designated as noise mitigators.

Example 34 include the method of any of Examples 26 to 33, wherein one or more of the clock signal pairs includes a conductive trace on an outermost layer of a circuit board.

Example 35 include an apparatus, comprising means for controlling a memory that includes two or more clock signal pairs for the memory, and means for applying a phase shift between respective clock signal pairs of the two or more clock signal pairs for the memory based on RFI mitigation information.

Example 36 include the apparatus of Example 35, further comprising means for determining the RFI mitigation information based on a resistance amount of one or more resistors populated on a circuit board.

Example 37 include the apparatus of any of Examples 35 to 36, further comprising means for determining the RFI mitigation information from a data structure.

Example 38 include the apparatus of Example 37, further comprising means for programming the RFI mitigation information in the data structure based on a resistance amount of one or more resistors populated on a circuit board.

Example 39 include the apparatus of any of Examples 37 to 38, wherein the data structure comprises a table that indicates respective amounts of delay to be applied to the respective clock signal pairs.

Example 40 include the apparatus of Example 39, wherein an amount of delay to be stored in an entry of the table for a first clock signal pair of the two or more clock signal pairs is based on a distance between the first clock signal pair and a second clock signal pair of the two or more clock signal pairs (e.g., a pair-to-pair spacing).

Example 41 include the apparatus of Example 40, wherein the second clock signal pair corresponds to a noise source and the first clock signal pair corresponds to a noise mitigator, and wherein the amount of delay to be stored in the entry of the table for the first clock signal pair corresponds to a phase shift between the first clock signal pair and the second clock signal pair for destructive interference between the noise source and the noise mitigator at an antenna location relative to a location of the first clock signal pair and the second clock signal pair.

Example 42 include the apparatus of Example 41, wherein clock signal pairs to be designated as noise sources are to be located closer to the antenna location relative to clock signal pairs to be designated as noise mitigators.

Example 43 include the method of any of Examples 35 to 42, wherein one or more of the clock signal pairs includes a conductive trace on an outermost layer of a circuit board.

Example 44 include at least one non-transitory one machine readable medium comprising a plurality of instructions that, in response to being executed on a computing device, cause the computing device to control a memory that includes two or more clock signal pairs for the memory, and apply a phase shift between respective clock signal pairs of the two or more clock signal pairs for the memory based on RFI mitigation information.

Example 45 include the at least one non-transitory one machine readable medium of Example 44, comprising a plurality of further instructions that, in response to being executed on the computing device, cause the computing device to determine the RFI mitigation information based on a resistance amount of one or more resistors populated on a circuit board.

Example 46 include the at least one non-transitory one machine readable medium of any of Examples 44 to 45, comprising a plurality of further instructions that, in response to being executed on the computing device, cause the computing device to determine the RFI mitigation information from a data structure.

Example 47 include the at least one non-transitory one machine readable medium of Example 46, comprising a plurality of further instructions that, in response to being executed on the computing device, cause the computing device to program the RFI mitigation information in the data structure based on a resistance amount of one or more resistors populated on a circuit board.

Example 48 include the at least one non-transitory one machine readable medium of any of Examples 46 to 47, wherein the data structure comprises a table that indicates respective amounts of delay to be applied to the respective clock signal pairs.

Example 49 include the at least one non-transitory one machine readable medium of Example 48, wherein an amount of delay to be stored in an entry of the table for a first clock signal pair of the two or more clock signal pairs is based on a distance between the first clock signal pair and a second clock signal pair of the two or more clock signal pairs (e.g., a pair-to-pair spacing).

Example 50 include the at least one non-transitory one machine readable medium of Example 49, wherein the second clock signal pair corresponds to a noise source and the first clock signal pair corresponds to a noise mitigator, and wherein the amount of delay to be stored in the entry of the table for the first clock signal pair corresponds to a phase shift between the first clock signal pair and the second clock signal pair for destructive interference between the noise source and the noise mitigator at an antenna location relative to a location of the first clock signal pair and the second clock signal pair.

Example 51 include the at least one non-transitory one machine readable medium of Example 50, wherein clock signal pairs to be designated as noise sources are to be located closer to the antenna location relative to clock signal pairs to be designated as noise mitigators.

Example 52 include the at least one non-transitory one machine readable medium of any of Examples 44 to 51, wherein one or more of the clock signal pairs includes a conductive trace on an outermost layer of a circuit board.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term “module” refers to any combination of software logic, firmware logic, hardware logic, and/or circuitry configured to provide the functionality described herein. The software may be embodied as a software package, code and/or instruction set or instructions, and “hardware”, as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the examples are not limited to the examples so described, but may be practiced with modification and alteration without departing from the scope of the appended claims. For example, the above examples may include specific combination of features. However, the above examples are not limited in this regard and, in various implementations, the above examples may include the undertaking only a subset of such features, undertaking a different order of such features, undertaking a different combination of such features, and/or undertaking additional features than those features explicitly listed. The scope of the examples should, therefore, be determined with reference to the appended claims, along with the full scope of equivalents to which such claims are entitled.

What is claimed is:

1. A memory device, comprising:

a circuit board;

memory on the circuit board; and interface circuitry on the circuit board coupled to the memory to provide a plurality of output data read paths and a plurality of input data write paths for the memory, wherein the interface circuitry further comprises:

two or more clock signal pairs for the memory, and radio frequency interference (RFI) mitigation circuitry coupled to the two or more clock signal pairs to provide a phase shift between respective clock signal pairs based on configuration information.

2. The memory device of claim 1, wherein the interface circuitry is further to:

determine the configuration information based on a resistance amount of one or more resistors populated on the circuit board.

3. The memory device of claim 1, wherein the interface circuitry is further to:

determine the configuration information from a data structure.

4. The memory device of claim 3, wherein the interface circuitry is further to:

program the configuration information in the data structure based on a resistance amount of one or more resistors populated on the circuit board.

5. The memory device of claim 3, wherein the data structure comprises a table that indicates respective amounts of delay to be applied to the respective clock signal pairs.

6. The memory device of claim 5, wherein an amount of delay to be stored in an entry of the table for a first clock signal pair of the two or more clock signal pairs is based on a distance between the first clock signal pair and a second clock signal pair of the two or more clock signal pairs.

7. The memory device of claim 6, wherein the second clock signal pair corresponds to a noise source and the first clock signal pair corresponds to a noise mitigator, and wherein the amount of delay to be stored in the entry of the table for the first clock signal pair corresponds to a phase shift between the first clock signal pair and the second clock signal pair for destructive interference between the noise source and the noise mitigator at an antenna location relative to a location of the first clock signal pair and the second clock signal pair.

8. The memory device of claim 7, wherein clock signal pairs to be designated as noise sources are to be located closer to the antenna location relative to clock signal pairs to be designated as noise mitigators.

9. The memory device of claim 1, wherein one or more of the two or more clock signal pairs includes a conductive trace on an outermost layer of the circuit board.

10. A system, comprising:

a controller; and a memory device coupled to the controller, the memory device comprising a circuit board, memory on the circuit board, and two or more clock signal pairs for the memory, wherein the controller is to apply a phase shift between respective clock signal pairs of the two or more clock signal pairs for the memory based on radio frequency interference (RFI) mitigation information.

11. The system of claim 10, wherein the controller is further to:

determine the RFI mitigation information based on a resistance amount of one or more resistors populated on the circuit board.

12. The system of claim 10, wherein the controller is further to:

determine the RFI mitigation information from a data structure.

13. The system of claim 12, wherein the controller is further to:

program the RFI mitigation information in the data structure based on a resistance amount of one or more resistors populated on the circuit board.

* * * * *